3,051,704
OPTICAL BRIGHTENING AGENTS OF THE 4,4'-BIS-(TRIAZINYLAMINO)-STILBENE DISULFONIC ACID SERIES
Robert Gehm, Oswald Schmidt, Heinrich Mertens, Wolfgang Grunwald, and Manfred Hehl, all of Ludwigshafen (Rhine), Germany, assignors to Badische Anilin- & Soda-Fabrik Aktiengesellschaft, Ludwigshafen (Rhine), Germany
No Drawing. Filed Jan. 19, 1960, Ser. No. 3,265
Claims priority, application Germany Jan. 24, 1959
3 Claims. (Cl. 260—240)

This invention relates to novel optical brightening agents and to a process for their production.

More particularly, the invention relates to optical brightening agents which are derivatives of 4,4'-bis-(triazinylamino)-stilbene disulfonic acid and which are water-soluble compounds of the formula

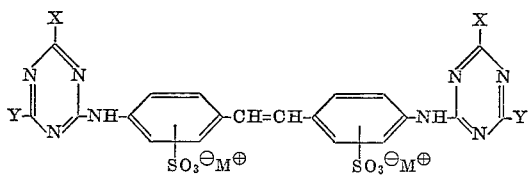

in which X stands for a substituent selected from the group consisting of

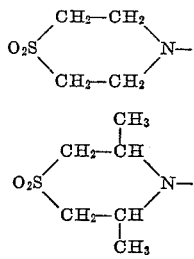

and

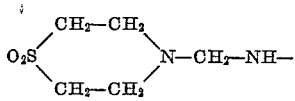

M⊕ stands for a cation, and Y is a hydroxy group, an amino group, a monosubstituted amino group, such as an alkylamino group, a cycloalkylamino group, a hydroxyalkylamino group, an alkoxyalkylamino group, and an arylamino group, a disubstituted amino group such as a dialkylamino group, a di(hydroxyalkyl) amino group and a di(alkoxyalkyl)-amino group, a pyrrolidino group, a morpholino group or a radical of the formula

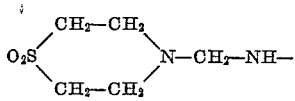

It is known that certain derivatives of 4,4'-bis-(triazinylamino)-stilbene disulfonic acid are optical brightening agents which may be used for brightening textiles, paper and other materials. Unfortunately, the fluorescent power of these substances is severely impaired when the materials to be brightened are additionally treated with precondensates of thermosetting resins which are applied in textile finishing, for example N,N'-dimethylol-4,5-dihydroxy imidazol-2-one.

It is an object of the present invention to provide new optical brightening agents, the fluorescent power of which is practically unimpaired by precondensates of thermosetting resins.

A further object of this invention is to provide optical brightening agents which exhibit the aforesaid properties and are moreover distinguished by good fastness to light and washing and a high degree of fluorescent or brightening power.

The new compounds of this invention are useful optical brightening agents and may be components of optical brightening compositions of all kinds, as for example bleaching baths, washing agents, brightening baths, washing liquors, paper pulps and the like. As a rule, the said new optical brightening agents are used in an aqueous medium as free sulfonic acids or in the form of water-soluble sulfonates, such as alkali metal sulfonates, as for example sodium and potassium sulfonate, ammonium sulfonate or sulfonic acid salts of organic bases, as for example the sulfonic acid salts of primary, secondary or tertiary amines. The optically brightened materials should preferably contain from 0.5 to 5% of the new optical brightening agents with reference to the weight of the said materials.

The mixtures described are suitable for the optical brightening of structures of all kinds both on the surface and in the mass, for example foils, films, felts, or textile materials, such as fibers, threads, flocks, woven or non-woven fabrics, of natural, regenerated and synthetic material, such as for example leather, synthetic polymers (plastics), and paper. Especially good effects are obtained in the optical brightening of structures of native or regenerated cellulose or linear polyamides.

A particular advantage of the new brightening agents in the fact that optical brightening compositions and brightened products containing the said brightening substances can be used in bleaching fibrous materials even under extreme conditions, for example cotton yarn in the form of cross-wound bobbins, with hydrogen peroxide in so-called "high-temperature apparatus" at temperatures above 100° C. for example at 110° to 120° C. Since their absorptive capacity, in contrast to the optical brightening agents hitherto known, is practically unimpaired by temperature of 110° to 120° C., the above-mentioned derivatives of 4,4'-diaminostilbene can be added directly to the baths used for bleaching.

The new brightening agents of the above Formula I can be prepared by various methods. For example, two mols of a cyanuric acid halide may be reacted with 1 mol of an alkali metal salt of a 4,4'-diamino-stilbene disulfonic acid of the general formula

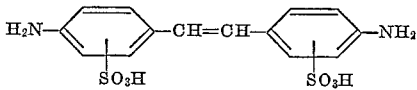

and then with two mols of a compound having the formula

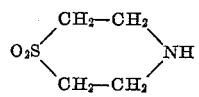

or

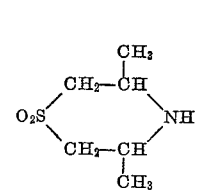

The halogen atoms in the molecules of the resulting products which can also be obtained when two mols of a cyanuric acid halide are first reacted with two mols of 1,1-thiamorpholine dioxide or 2,6-dimethyl-1,1-thiamorpholine dioxide and the reaction product is further reacted with an alkali salt of a 4,4'-diaminostilbene disulfonic acid of the general Formula V are then replaced by reacting these products with aqueous alkali, ammonia, suitable primary or secondary alkyl, cycloalkyl, hydroxyalkyl, alkoxyalkyl, aryl or heterocyclic amines or by reacting the said products with formaldehyde and 1,1-thiamorpholine dioxide.

1,1-thiamorpholine dioxide and 2,6-dimethyl-1,1-thiamorpholine dioxide can be prepared according to the process described in the copending patent application Serial No. 828,048, filed July 20, 1959, by Robert Gehm and Johannes Dehnert.

The above-mentioned reaction of cyanuric acid halides, for example cyanuric acid chloride, with an alkali metal salt of a 4,4'-diaminostilbene disulfonic acid and the said 1,1-thiamorpholine dioxide derivatives is preferably carried out in aqueous or organic liquids. Inert solvents and/or diluents may be used for this purpose, particularly those which are miscible with water, as for example acetone, dioxane, dimethylformamide or N-methyl pyrrolidone alone, either in admixture with each other or with water. The hydrohalic acid, for example hydrochloric acid evolved during this reaction is neutralized for example by adding an alkaline reagent such as sodium bicarbonate, sodium carbonate or a dilute aqueous solution of sodium or potassium hydroxide. Low reaction temperatures, for example a temperature between $-10°$ and $+10°$ C., are preferred during the first reaction step, i.e., when the cyanuric acid halides are combined with the diaminostilbene disulfonic acids of Formula V.

When the 1,1-thiamorpholine dioxide derivatives of Formula VI or VII are introduced into the reaction mixture, the reaction temperature is slightly raised to for example $+10°$ to $+40°$ C. During the third reaction step, i.e., when the reaction products are further reacted with aqueous alkali, ammonia, the amines mentioned above or with mixtures of formaldehyde and 1,1-thiamorpholine dioxide, the reaction temperature is raised to still higher values, for example to $+60°$ to $200°$ C.

The alkali metal salts, the ammonium salts, and the salts of the organic bases named above of the compounds of Formula I are prepared in known manner by using the optical brightening agents of Formula I in the form of their free sulfonic acids.

Procedures illustrating the production of the new optical brightening agents are given in Examples 1 and 7 of this specification.

The following examples will further illustrate this invention, but the invention is not restricted to these examples. The parts and percentages specified in the examples are by weight.

Example 1

Preliminarily cleansed cotton yarn in the form of cross-wound bobbins is treated for an hour at a temperature of 115° to 120° C. in a closed apparatus suitable for temperatures above 100° C. at a liquor ratio of 10:1 in an aqueous bath containing in each liter 2 ccs. of 40% hydrogen peroxide, 1 gram of sodium hydroxide, 4 ccs. of a 50% aqueous sodium silicate solution, 0.5 gram of crystallized magnesium sulfate ($MgSO_4.7H_2O$) and 0.01 to 0.05 gram of the 4,4'-diaminostilbene derivative of the formula

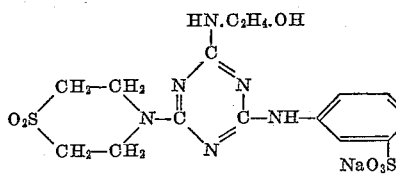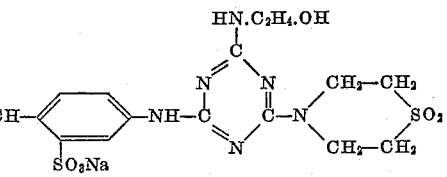

VIII

The material is then rinsed and dried. An optically brightened cotton yarn is obtained having a strong and brilliant whitening effect.

The compound of the Formula VIII can be prepared in the following way:

(a) A solution of 37 parts of cyanuric acid chloride in 240 parts of acetone is allowed to flow slowly while cooling into a mixture of 400 parts of ice and 400 parts of water. Into this mixture there is then introduced at 0° to $+5°$ C. a solution of 27 parts of 1,1-thiamorpholine dioxide and 10.6 parts of sodium carbonate in 400 parts of water and the reaction mixture stirred for half an hour at this temperature. Then it is filtered by suction, washed with ice water and there are obtained 50 parts of N-(2,4-dichlor-1,3,5-triazinyl)-1,1-thiomorpholine dioxide, which after recrystallization from ethanol occurs in the form of white needles of the melting point 216° C.

(b) Into a mixture of 94 parts of the intermediate product described under (a) with 1500 parts of acetone there is introduced at $-25°$ C. a solution of 64 parts of 4,4'-diaminostilbene-2,2'-disulfonic acid and 27 parts of sodium hydroxide in 1500 parts of water. The reaction mixture is further stirred for another 3 hours at $+25°$ C. The deposited product is then filtered off by suction and dried. 82 parts of the reaction product are obtained. A further 50 parts are recovered from the mother liquor.

(c) 90 parts of the product described under (b) and 31 parts of ethanolamine are boiled in 300 parts of water for 3 hours under reflux. The compound of the Formula VII is obtained in a very good yield.

For the production of the compound of the Formula VIII it is not necessary to isolate the intermediate products. It is possible, in a way similar to the known methods for the production of derivatives of 4,4'-diaminostilbene, first to react the diaminostilbene disulfonic acid with cyanuric acid chloride and then to exchange the reactive chlorine atoms remaining on the triazine rings for the radicals of 1,1-thiamorpholine dioxide and ethanolamine.

Example 2

Preliminarily bleached cotton fabric is treated for an hour at a liquor ratio of 50:1 in an aqueous bath containing in each liter 0.01 to 0.05 gram of the 4,4'- diaminostilbene derivative of the formula

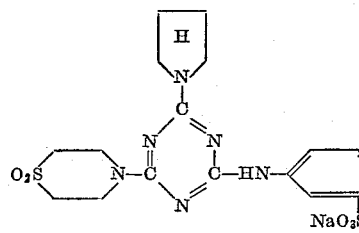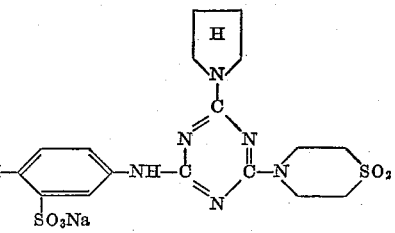

IX 3 grams of sodium dithionite and 2 grams of sodium carbonate (anhydrous) and then dried. A fabric is obtained which exhibits an excellent whitening effect of good fastness to light and washing.

Instead of the compound IX, there may be used with similar results the corresponding amount of the 4,4'-diamino-stilbene derivative of the formula

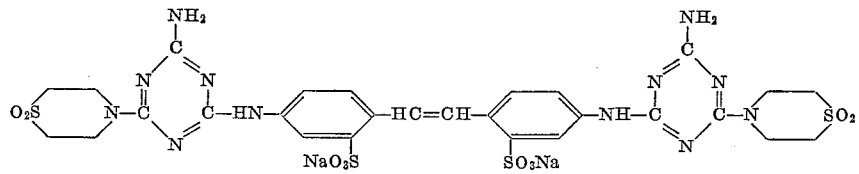

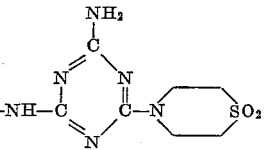

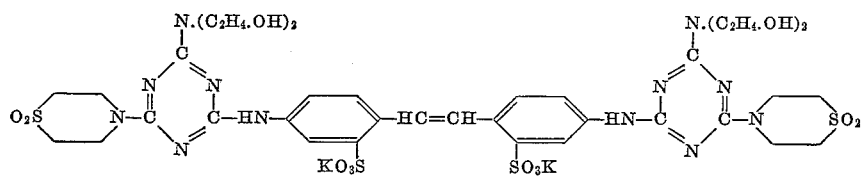

*Example 3*

1 kilogram of a conventional household detergent for white washing is mixed with 0.5 to 3 grams of the compound of the formula specified in Example 2. If uncolored soiled washing is treated with a bath which contains per liter 5 to 10 grams of the resultant mixture, a pure white, optically brightened washed material is obtained.

The brightening effect is also very good when the compound of the Formula IX is replaced by the corresponding amount of the 4,4'-diaminostilbene derivative of the formula

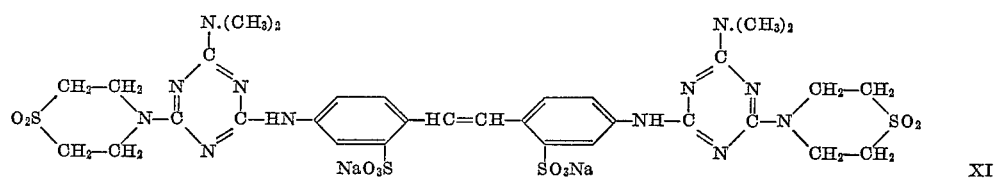

*Example 4*

Uncolored soiled washing is washed with a conventional household detergent for white washing. The washed material is then treated for 10 to 20 minutes at 40° C. in an aqueous bath which contains per liter about 0.01 gram of the 4,4'-diaminostilbene derivative of the formula

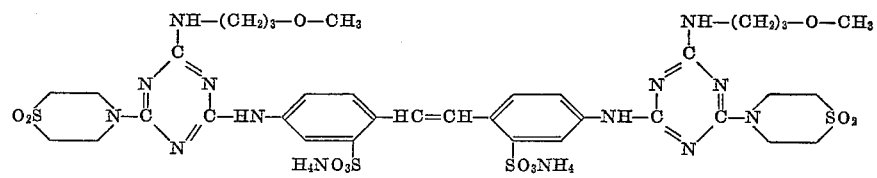

at a liquor ratio of 20:1 to 50:1. A very well optically brightened washed material is thus obtained.

If the compound of the Formula XII be replaced by the corresponding amount of the 4,4'-diaminostilbene derivative of the Formula XI specified in Example 3, the brightening effect obtained therewith is also very good.

*Example 5*

Fabric of polycaprolactam is kept in motion for 20 minutes at a liquor ratio of 50:1 at 70° C. in an aqueous bath containing per liter 0.05 to 0.1 gram of the 4,4'-diaminostilbene derivative of the formula and 2% of 85% formic acid—with reference to the weight of the fabric. The textile material thus treated is distinguished from untreated fabric of the same kind by an excellent degree of whiteness of excellent fastness to light.

*Example 6*

Yellowish white paper is treated with an aqueous solution which contains per liter 0.07 to 0.5 gram of the 4,4'-diaminostilbene derivative of Formula VIII described in Example 1. The paper is then rinsed and dried. A marked brightening effect of very good fastness to light is achieved thereby.

The same effect can also be achieved by adding 0.1 to 1 gram per liter of the same compound to the usual paper pulp.

*Example 7*

Preliminarily washed fabric of polycaprolactam is treated at 70° C. for 20 minutes at a liquor ratio of 50:1 in an aqueous bath which contains per liter 0.05 to 0.1 gram of the 4,4'-diaminostilbene derivative of the formula

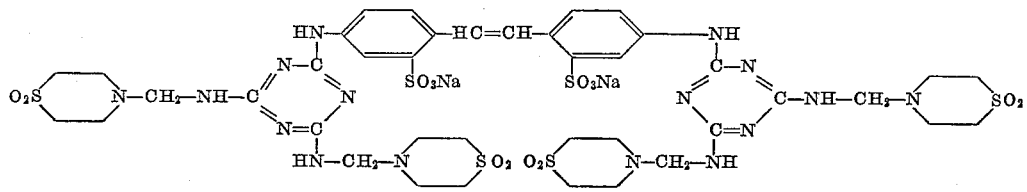

and 2% of formic acid (85%) with reference to the weight of fabric. The textile material thus treated is distinguished from untreated fabric of the same kind by a considerably improved whiteness effect of good fastness to light. A similar effect is obtained by using the corresponding triethanolamine salt.

The compound of the Formula XIV can be obtained in the following way:

20 parts of the compound of the formula

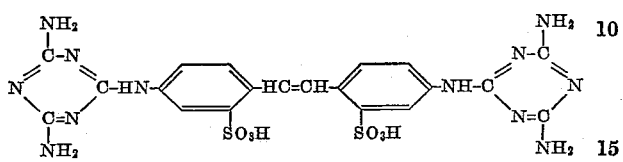

obtainable in known manner are dissolved in 300 parts of 2 N aqueous sodium hydroxide solution. Into this solution there are introduced 15 parts of 1,1-thiamorpholine dioxide. Then 11 parts of a 30% aqueous formaldehyde solution is allowed to flow in slowly and the mixture is heated for 7 hours at 70° C. The compound of the Formula XIV is separated in the form of the free sulfonic acid by addition of dilute aqueous hydrochloric acid.

*Example 8*

Previously bleached cotton fabric is treated at 45° C. for 20 minutes in a bath containing per liter 0.05 to 0.1 gram of the compound of the formula

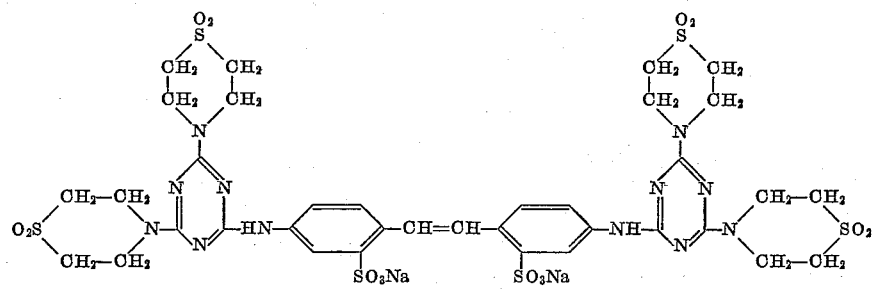

at a liquor ratio of 50:1 using water of 214.8 U.S. degrees of hardness.

After drying, the cotton fabric thus treated is distinguished from untreated fabric of the same kind by a considerably improved whiteness effect.

A similar brightening effect is obtained by using, instead of the brightening compound of the first paragraph of this example, the compounds of the following table:

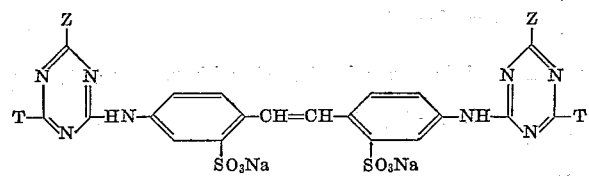

| T | Z |
|---|---|
| 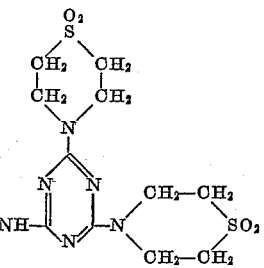 | 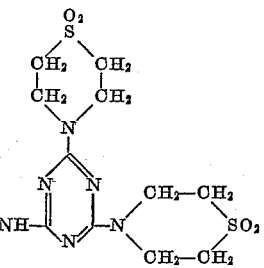 |

*Example 9*

A previously washed polycaprolactam fabric is treated at a liquor ratio of 50:1 at 90° C. for 20 minutes in an aqueous bath which contains per liter 0.05 to 0.1 gram of the optical brightening agent specified in the first paragraph of Example 8 and the pH of which has been adjusted to 4.5 by adding 85% formic acid. After drying, the fabric shows a considerably improved degree of whiteness as compared with an untreated fabric of the same kind.

Instead of the optical brightening substances of the first paragraph of Example 8 there may be used the compounds of the table given in the third paragraph of Example 8.

*Example 10*

A previously bleached cotton fabric is impregnated with an aqueous solution containing per liter 1 gram of the optical brightening agent described in the first paragraph of Example 1 and 75 grams of N,N'-dimethylol-4,5-dihydroxy-imidazol-2-one, and 15 grams of magnesium chloride, squeezed off and dried at 80° C. The dry impregnated fabric is then treated for 5 minutes with hot air at 155° C. so that condensation takes place. The fabric thus finished shows a considerably improved degree of whiteness as compared with a cotton fabric which has been finished in the same manner except that instead of the abovementioned optical brightening agent the compound of the formula

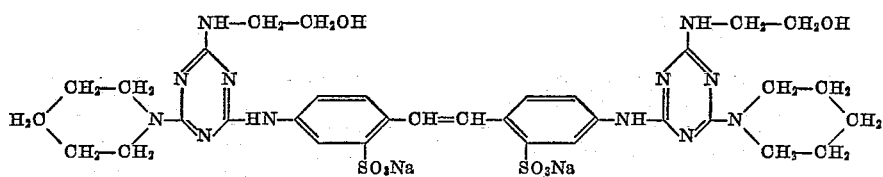

(an optical brightening agent of the prior art) has been used.

Example 11

Samples of polycaprolactam fabric are treated with an optical brightening agent according to this invention and with prior art optical brightening agents of a comparable chemical structure.

The samples are prepared as follows:

A previously washed polycaprolactam fabric is treated at a liquor ratio of 50:1 at 90° C. for 20 minutes in an aqueous bath, the pH of which has been adjusted to 4.5 by adding 85% formic acid containing per liter 0.1 gram of one of the optical brightening agents listed in the following table. Then the fabric is dried at 80° C.

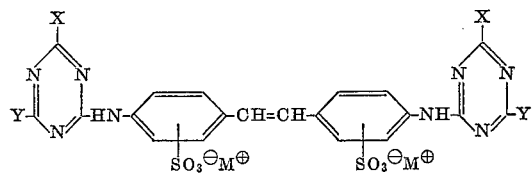

| | W |
|---|---|
| A | 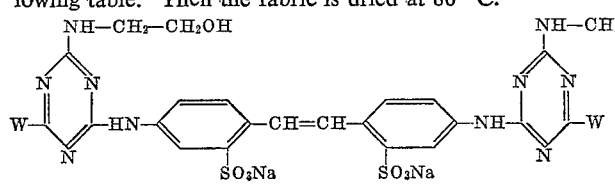 |
| B | (H₂C analog with CH₂-CH₂/CH₂-CH₂ ring, N—) |
| C | (O analog with CH₂-CH₂/CH₂-CH₂ ring, N—) |

The fluorescent power of the samples is then measured by means of a "Fluorometer" as manufactured by Dr. B. Lange, Berlin. The method of measuring is described by H. Jörder in "Melliand Textilberichte," vol. 40 (1959), pages 1190 to 1194. As the control there is used a sample of the same but untreated polycaprolactam fabric. The galvanometer is set in such a way that the reading from the control sample is 0 and only the difference between the fluorescent intensities of the samples treated with the optical brightening agents on the one hand and the control sample on the other hand is measured. The following table shows the scale readings.

| Sample: | Scale reading |
|---|---|
| A | 38.5 |
| B | 33.5 |
| C | 31.0 |
| Control | 0 |

It can be seen that the sample treated with the optical brightening agent according to this invention (A) has a considerably higher fluorescent intensity than the other samples.

We claim:

1. A water-soluble compound of the formula

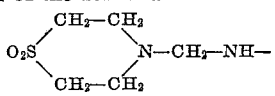

in which X stands for a substituent selected from the group consisting of

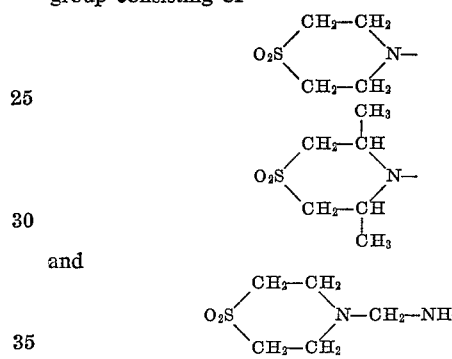

and $$O_2S\begin{pmatrix}CH_2-CH_2\\CH_2-CH_2\end{pmatrix}N-CH_2-NH-$$

$M^\oplus$ is a cation and Y is a substituent selected from the group consisting of hydroxy, amino, dimethylamino, 2-hydroxyethylamino, di-(2-hydroxyethyl)-amino, 3-methoxypropylamino, phenylamino, pyrrolino, morpholino and the radical of the formula $$O_2S\begin{pmatrix}CH_2-CH_2\\CH_2-CH_2\end{pmatrix}N-CH_2-NH-$$

2. A water-soluble compound of the formula

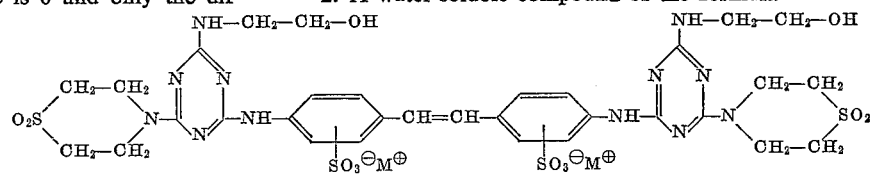

wherein $M^\oplus$ is an alkali metal cation.

3. A water-soluble compound of the formula

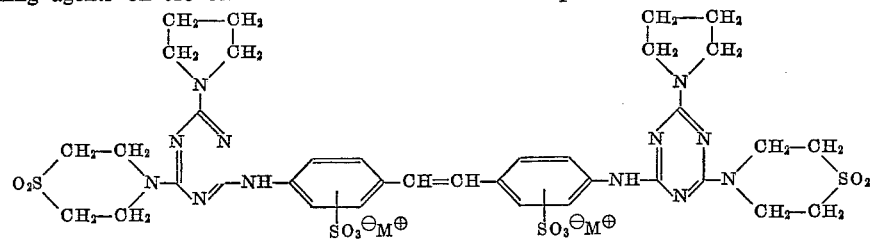

wherein $M^\oplus$ is an alkali metal cation.

References Cited in the file of this patent

UNITED STATES PATENTS

| 2,618,636 | Williams et al. | Nov. 18, 1952 |
| 2,658,065 | Wallace et al. | Nov. 3, 1953 |
| 2,666,052 | Williams et al. | Jan. 12, 1954 |

FOREIGN PATENTS

| 152,928 | Australia | Aug. 24, 1949 |

OTHER REFERENCES

Elderfield: "Heterocyclic Compounds," volume 5, pages 612 to 616, John Wiley and Sons (1957).

UNITED STATES PATENT OFFICE
CERTIFICATE OF CORRECTION

Patent No. 3,051,704                                          August 28, 1962

Robert Gehm et al.

It is hereby certified that error appears in the above numbered patent requiring correction and that the said Letters Patent should read as corrected below.

Column 10, line 39, for "pyrrolino" read -- pyrrolidino --.

Signed and sealed this 23rd day of June 1964.

(SEAL)
Attest:

ERNEST W. SWIDER                                      EDWARD J. BRENNER
Attesting Officer                                         Commissioner of Patents